Jan. 20, 1959  E. L. BYRKETT ET AL  2,869,243
GAGING APPARATUS
Filed Jan. 15, 1957  5 Sheets-Sheet 3

INVENTORS
Elwood L. Byrkett
Harry D. Kiefaber
BY Edward J. Noe Jr.
ATTORNEY

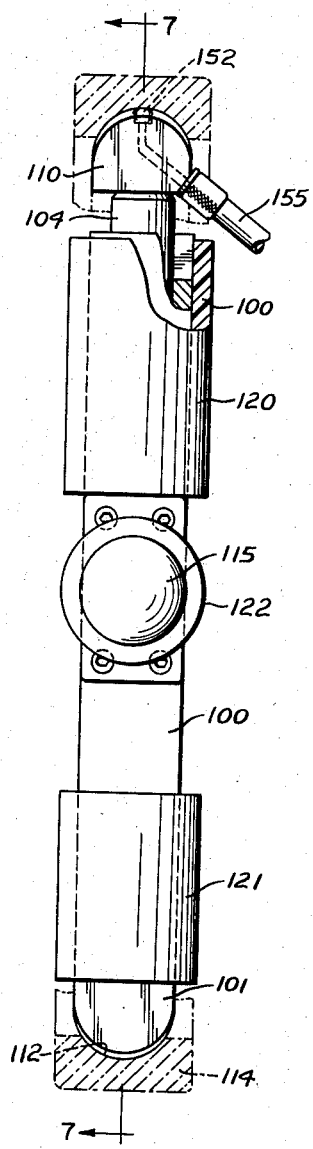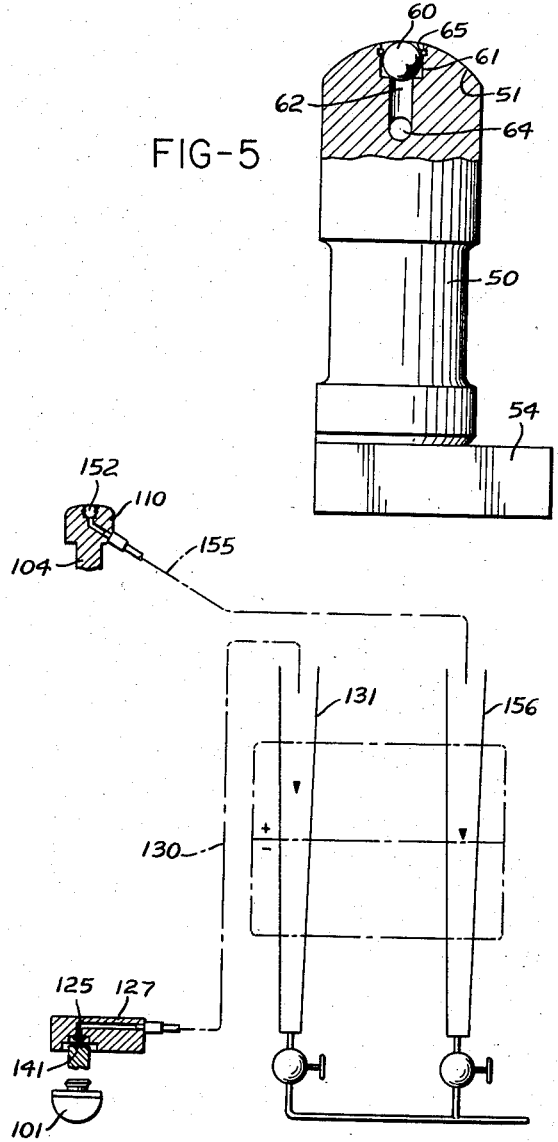

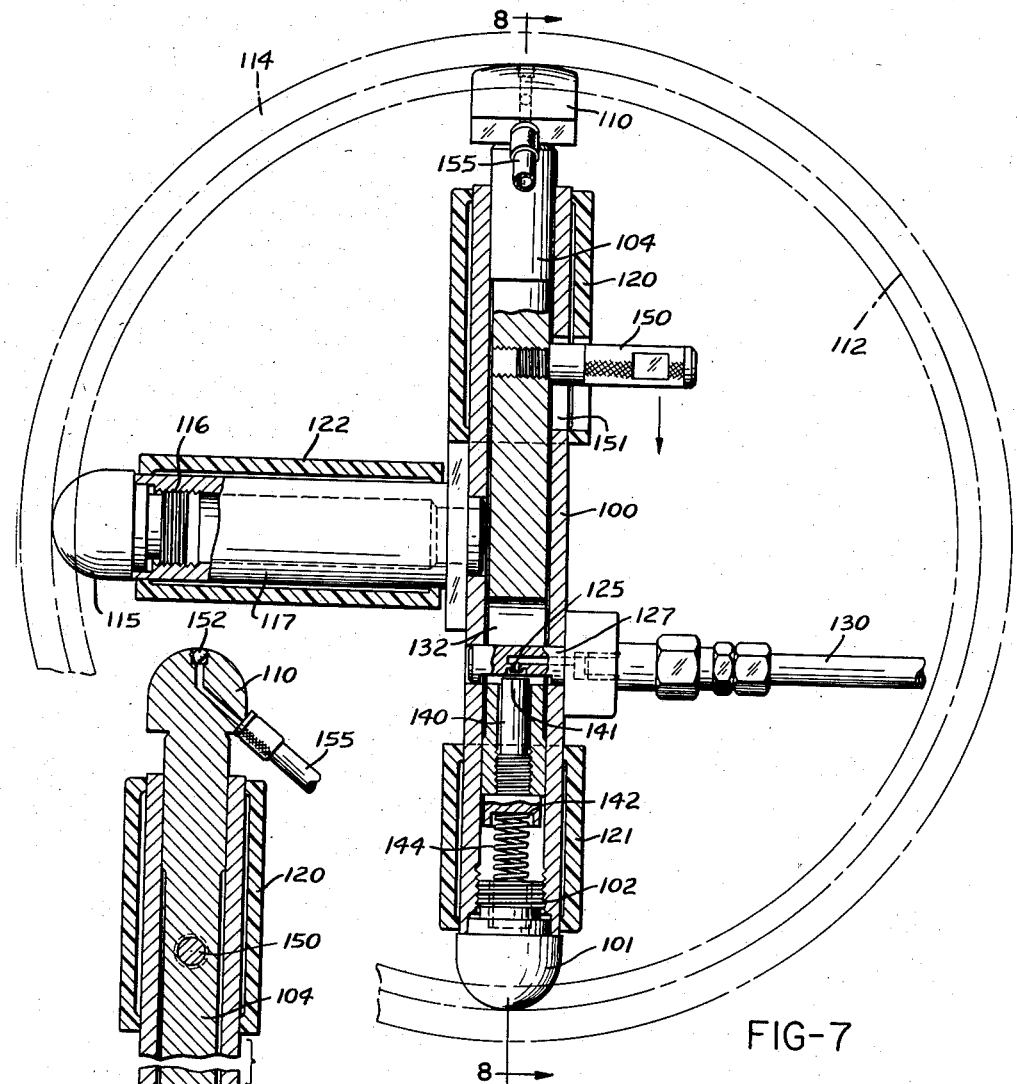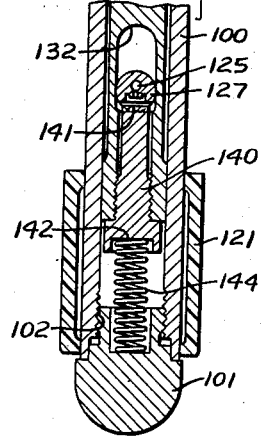

United States Patent Office 2,869,243
Patented Jan. 20, 1959

2,869,243

GAGING APPARATUS

Elwood L. Byrkett and Harry D. Kiefaber, Dayton, Ohio, assignors to The Sheffield Corporation, Dayton, Ohio, a corporation of Delaware Application January 15, 1957, Serial No. 634,226

12 Claims. (Cl. 33—178)

This invention relates to gaging apparatus and more particularly to apparatus for gaging dimensions and the like.

It is an object of this invention to provide a gaging apparatus comprising first and second gaging means, the first gaging means including a gaging contact movable within a limited range and carrying the second gaging means, whereby gaging is accomplished through the range of movement of the gaging contact and beyond that range by the second gaging means.

It is a further object to provide such an apparatus wherein said first and second gaging means include indicating means of low and high amplification respectively, whereby operations of increasing accuracy are possible as critical dimensions are more closely approached during, for example, in-process gaging of a workpiece or the like.

It is a further object to provide such an apparatus wherein said second gaging means is associated with the work at substantially the same location as the gaging contact but with little or no work contact pressure whereby gaging at the final dimension is possible without marring, distorting, or otherwise disturbing the work surface at the final desired dimension.

It is a further object to provide such a gaging apparatus including two opposed gaging contact assemblies wherein independent indicating means are provided for each assembly for aid in centralizing the apparatus during set-up.

Figure 1:
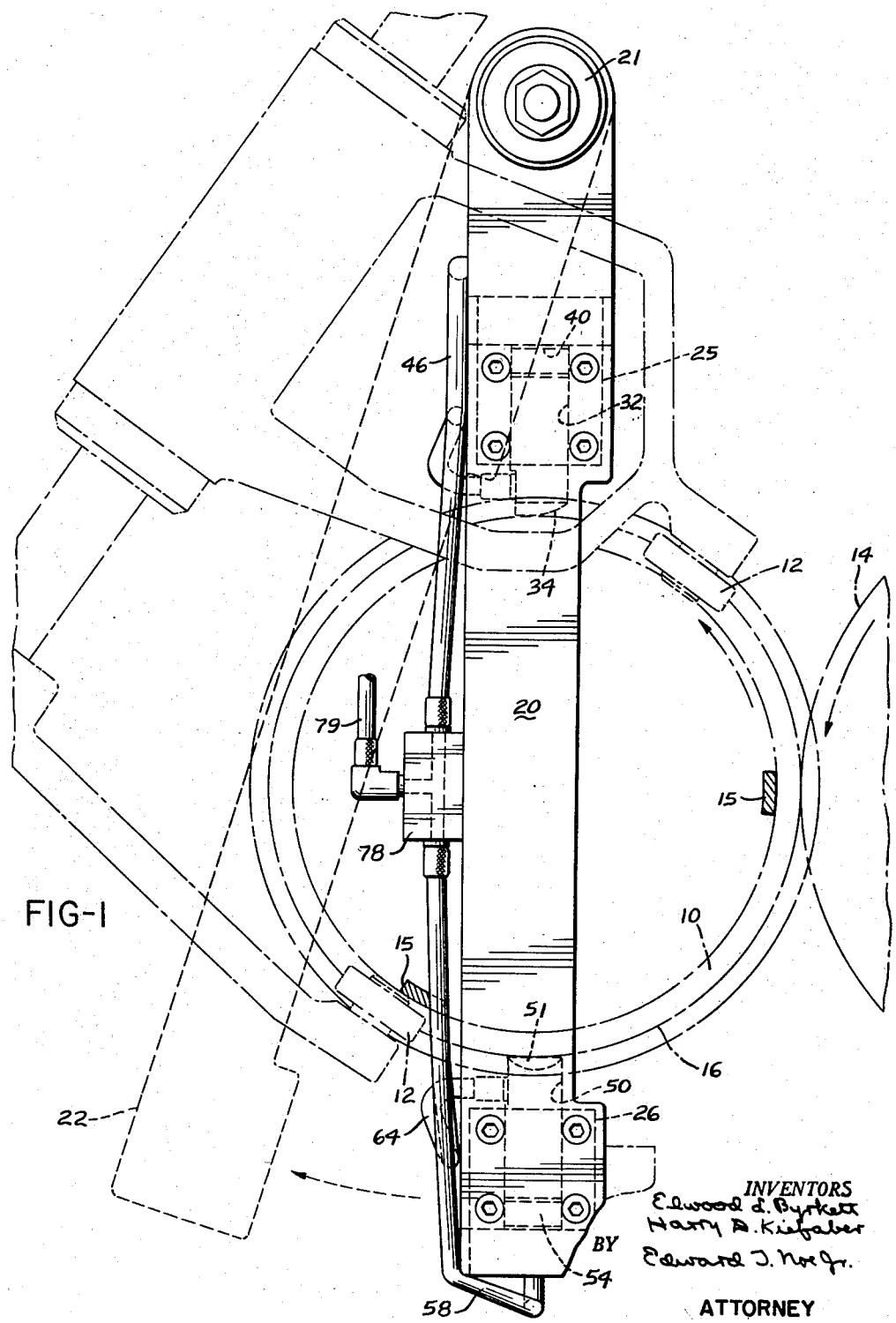
Figure 2:
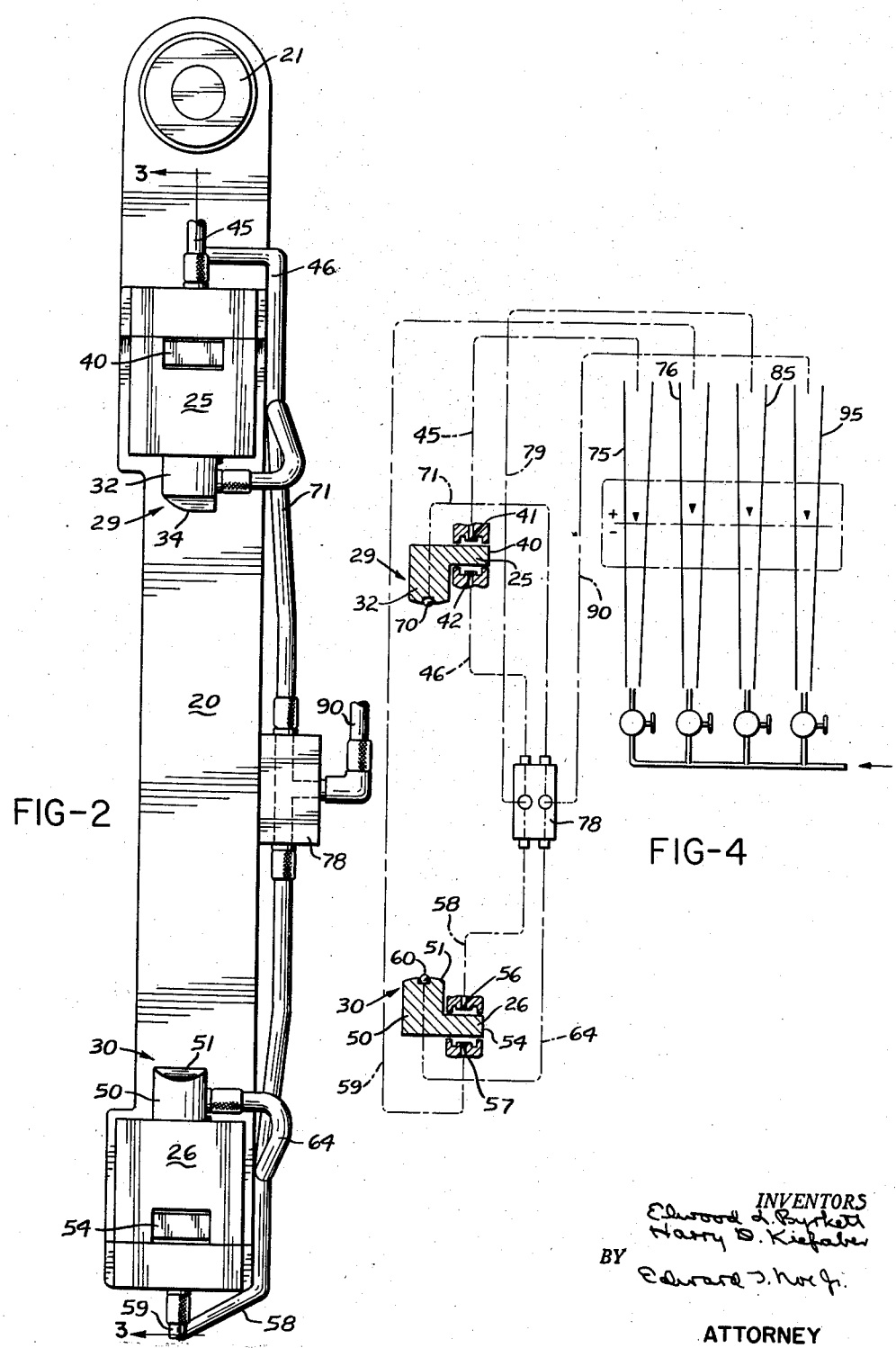
Figure 3:
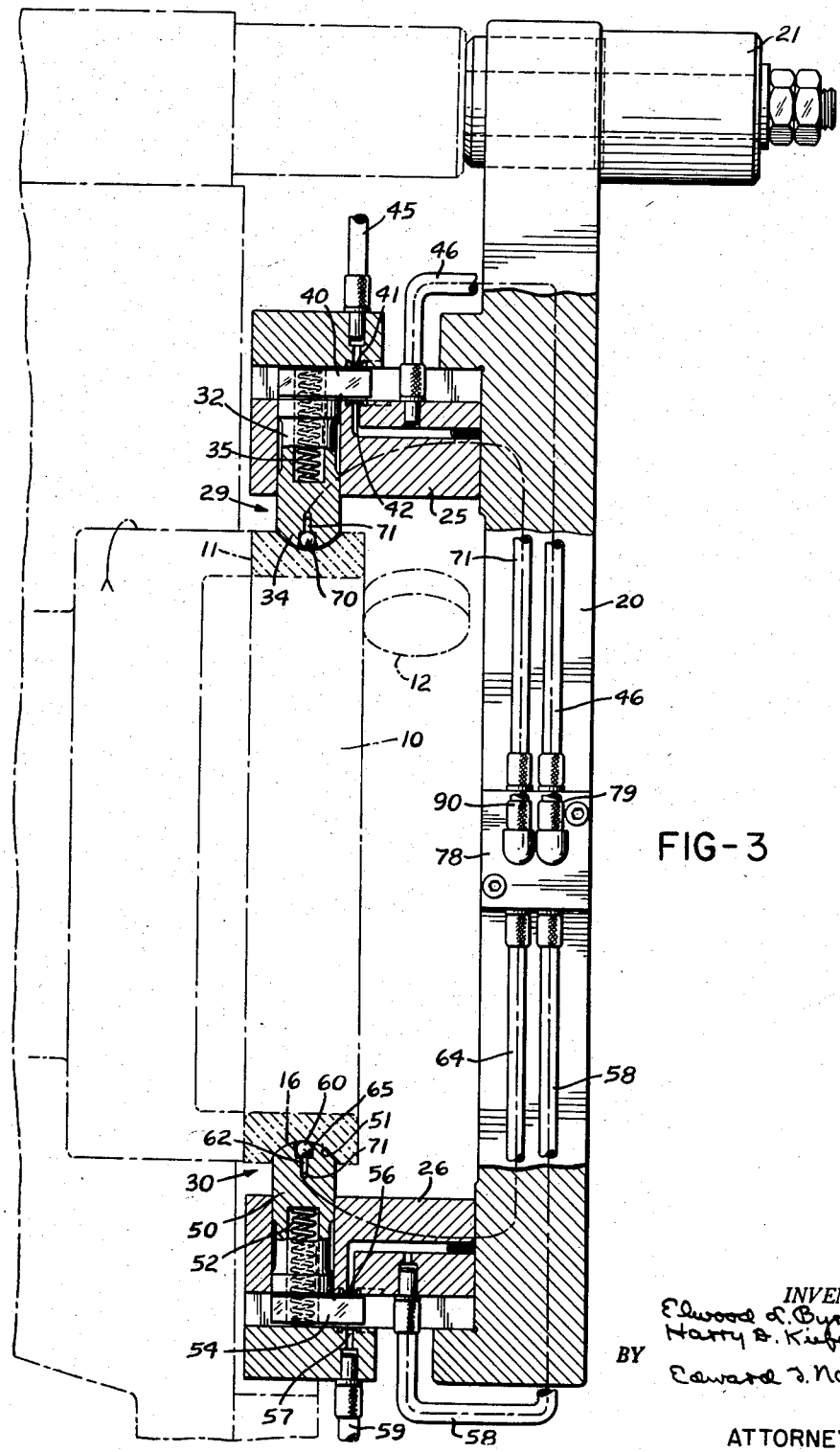

Other objects and advantages of the invention will be apparent from the following description, the appended claims, and the accompanying drawings, in which, Figure 1 shows a first embodiment of a gaging apparatus in association with a bearing ring and grinding mechanism illustrated in phantom, during in-process gaging, Figure 2 illustrates the other side of the apparatus of Figure 1, Figure 3 is a view of the apparatus in partial central section along line 3—3 of Figure 2, Figure 4 is a diagrammatic illustration of the air gaging circuits involved in the operation of the first embodiment of the exemplary apparatus, Figure 5 is a central section through one of the gaging contacts of the apparatus of Figures 1 to 4, Figure 6 is a side view of a second embodiment of the invention shown in gaging association with an outer bearing ring illustrated in phantom, Figure 7 is a central section of the second embodiment taken on line 7—7 of Figure 6, Figure 8 is a central section at right angles to the section of Figure 7 taken on line 8—8 of Figure 7 and, Figure 9 is a diagrammatic illustration of the gaging circuit of the second embodiment of Figures 6 to 8.

Exemplary embodiments of the present invention have been illustrated and will be described as applied to the gaging of diameters of raceways of inner and outer bearing rings. It will be appreciated that the invention is not limited to the structural embodiments illustrated and would have application to the gaging of other and materially different workpieces.

In each of the illustrated modifications a gaging contact is movably supported in a body for positioning engagement with the surface of a workpiece for gaging its dimension within a given range. Further gaging means carried by the gaging contact are associated with the work at substantially the same location and are responsive to dimensions beyond the range of movement of the gaging contact. In the illustrated applications this gaging means comprises a freely rotatable ball which controls air issuing through a leakage orifice cooperating therewith. Independent indicating means associated with the first gaging contact and said gaging means can be of low and high amplifications respectively in order that a broad approach range be provided as the gaging contact engages the work surface and a precise, high amplification indication obtained as the gaging ball then measures the work dimension. For workpieces subject to possible distortion by gaging pressures and requiring fine finish surface this provides a gaging apparatus where, in a single gage, an approach and final gaging range is provided with little or no contact pressure during the final gaging to prevent distortion, marring or the like.

Figures 1 to 5 illustrate the invention as embodied in a caliper type device for gaging the diameter of an inner raceway of a ball bearing during its grinding on a centerless type grinder of a type known in industry. In the grinding application illustrated an outer bearing ring 10 is held against a driven face plate 11 by rollers 12 as grinding wheel 14 grinds the bearing raceway 16. During grinding, ring 10 is urged against supporting shoes 15.

The gaging apparatus comprises a gaging body 20 mounted on a post 21 for swinging movement from a retracted position shown dotted at 22 in Figure 1 downward against a stop to a substantially vertical position for gaging the diameter of raceway 16 during grinding. Body 20 has a pair of arms 25, 26 extending laterally therefrom which support the opposed gaging contact assemblies 29 and 30 respectively.

The contact assemblies are substantially identical in construction. Upper assembly 29 comprises a substantially L-shaped gaging contact 32 slidable in arm 25 and having a lower end 34 conformed for engagement with raceway 16 at one side thereof. Spring 35 enclosed within contact 32 acts between the contact and arm 25 to urge the contact into positioning engagement with raceway 16. An extension 40 forming a part of contact 32 is positioned between opposed fluid leakage gaging orifices 41 and 42 provided in arm 25. Upon movements of contact 32 during gaging the flow through these orifices and conduits 45 and 46 respectively connected thereto will be controlled.

Similarly a gaging contact 50 movable within arm 26 has an outer end 51 urged by spring 52 into engagement with raceway 16. Contact 50 has an extension 54 cooperating with orifices 56 and 57 to control the flow through conduits 58 and 59 respectively for gaging as will be later described. Contact 50 of assembly 30 is shown enlarged and in section in Figure 5. Extensions 40 and 54 on contacts 32 and 50 also serve to limit the movement of these contacts relative to arms 25 and 26 during gaging.

Further gaging means are provided for each of the contact assemblies for gaging association with the work beyond the limited range of movement of contacts 32 and 50. As seen in Figure 5, for contact 50 this gaging means comprises a freely rotatable ball 60 seated in a counterbore pocket 61 providing an orifice 62 in communication with an air supply passage 64. The ball is held in position by a snap ring 65 and engages the surface of raceway 16 centrally within the outer end 51 of contact 50 and at substantially the same location.

Similarly contact 32 supports a freely rotatable ball 70 centrally at its outer end for association with raceway 16. Ball 70 cooperates with a valve seat to control the flow through passage 71. Both balls 65 and 70 are freely rotatable and are urged into engagement with the work solely by the force of the air issuing thereagainst through passages 64 and 71 respectively.

During the initial gaging phase balls 65 and 70 are tangent to the curvature of the outer ends 34 and 51 of contacts 32 and 50 respectively. When extensions 40 and 54 engage surfaces of arms 25 and 26 to limit or stop their inward movement balls 60 and 70 then follow the raceway surface of the part for the final gaging phase.

In the diagram of Figure 4 the various controlled air leakage gaging means of the apparatus are shown as including known indicating devices of the type wherein a vertically movable float is positioned along the internal taper of a transparent vertical flow tube connected to a source of air under controlled pressure in accordance with the velocity of flow as determined by the gaged dimension.

Orifices 41 and 57 are respectively connected to columns 75 and 76. These orifices are associated with the outer surfaces of extensions 25 and 26 on gaging contacts 32 and 50 respectively. During set-up the supporting structure of the apparatus is adjusted until equal indications are obtained in columns 75 and 76 while the gaging apparatus is in association with a master or the like, thus indicating that the apparatus is centrally located.

Orifices 42 and 56 communicate respectively with passages 46 and 58 leading to a manifold block 78 where they join to passage 79 leading to column 85 for a broad range, low amplification gaging indication. During the initial low amplification gaging, flow through these orifices is determined by the association of contacts 32 and 50 with raceway 16 and a single indication is provided of the raceway diameter as it is rough ground. Also column 85 indicates that sliding contacts 32 and 50 have moved to their fullest extent under the urging of springs before balls 70 and 60 move outward relative thereto for the second gaging phase.

As previously mentioned balls 60 and 70 control the flow through passages 64 and 71 respectively. These passages join through manifold block 78 with a conduit 90 leading to column 95 for a relatively high amplification indication. Thus after the preliminary gaging phase has been completed and the indicating float has traversed the major portion of column 85 balls 60 and 70 follow the work surface during the final sizing and high amplification column 95 indicates the raceway diameter during the final phase of the operation.

Thus, an extremely broad over-all range of gaging is possible with final sizing to high amplification and with very light or no force applied to the work. In many components distortion is possible and the final ground surface must be unmarred. The described apparatus makes possible high precision gaging while satisfying these requirements. In one commercial example of bearing raceway grinding the present apparatus provides a total gaging range of 0.00485 inch with a final sizing to a precision of 0.000050 inch.

In operation the apparatus of Figures 1 to 5 is initially adjusted until columns 75 and 76 have equal indications, showing that the apparatus is centrally adjusted and that extentions 40 and 54 are equally spaced from orifices 41 and 57 in body 20. As grinding proceeds column 85 connected to orifices 42 and 56 indicates the relative movements of contacts 32 and 50 until their limit of movement is reached to provide a low amplification, broad approach gaging range. Balls 60 and 70 then follow the raceway surface of the part during the final gaging phase with little or no gaging contact pressure while controlling orifices leading to column 95, providing a high amplification indication.

A second, hand-operated modification of the invention disclosed in Figures 6 to 9 is provided for gaging an outer raceway at various steps during its grinding. It comprises body 100 which has a first gaging contact 101 screwed within one end at 102. A telescoping slide 104 is slidable within body 100 and carries a second gaging contact 110 for engagement with a diametrically opposite point on bearing raceway 112 of ring 114. A locating contact 115 is threaded at 116 within an extension 117 at one side of body 100. Insulating sleeves 120, 121 and 122 are provided to minimize the effect of heat from the operator's hand.

A leakage orifice 125 is provided in an insert 127 in body 100 and the orifice is connected through a conduit 130 with an indicating column 131 of the type previously referred to for a broad, low-amplification indication. Slide 104 has an opening 132 through which insert 127 extends. At its lower end the opening 132 in slide 104 has an insert 140 threaded thereinto. Insert 140 provides a flow controlling surface 141 in opposition to orifice 125 and also provides a seat 142 for a spring 144 cooperating between slide 104 and contact 101 fixed to body 100.

A pin 150 threaded into slide 104 extends outward through a slot 151 in body 100. By manually grasping pin 150 slide 104 is telescoped within body 100 so that the apparatus can be inserted within the outer raceway 112. Upon release, spring 144 urges contacts 101 and 110 into engagement with opposed portions of the raceway surfaces while contact 115 insures that gaging is along a diameter.

Contact 110 supports a freely rotatable gaging ball 152 centrally at its outer end for gaging association with raceway 112 at substantially the same location. Ball 152 cooperates with an inner valve seat as does ball 60 of Figure 5. Flow through passage 155 leading to column 156 is thus controlled to provide a high amplification indication of the relative positions of ball 152 and contact 110.

During gaging, pin 150 is initially grasped to telescope slide 104 within body 100 and retract contact 110 so that the apparatus can be inserted within the outer raceway and released. During the initial gaging phase as slide 104 moves outward relative to body 100 flow controlling surface 141 approaches orifice 125 and the float within the column 131 falls gradually. When surface 141 engages insert 127 the outward telescoping movement is terminated and ball 152 then follows the raceway surface and is active in gaging through the final phase, controlling flow through high amplification column 156 and providing distortionless and mar-free gaging of the surface as its final dimension is approached. Column 131 in addition to indicating the preliminary gaging phase also precisely indicates whether slide 104 has fully moved outward relative to body 100.

Thus, it is seen that a gaging apparatus has been provided which, in a single unit, provides an extremely broad gaging range with very high precision through a final gaging phase. In addition, accuracy of operation is insured and a final gaging is provided which cannot distort delicate parts or mar finished or critical surfaces.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. Gaging apparatus for measuring a work surface comprising a body, gaging contact means supported by said body for movement relative thereto and positioning engagement with the surface of the work to be gaged, limit means cooperating between said body and said gaging contact means having stop surfaces at the limits of a first gaging range, first gaging means responsive to relative movement between the gaging contact means and body through said first gaging range, and further gaging means carried by said body operative through a second gaging range beyond said first gaging range as a final dimension is approached said further gaging means including means associated with the work surface with substantially no contact pressure whereby marring or distortion at the final dimension is avoided.

2. Gaging apparatus as set forth in claim 1 wherein said further gaging means includes air leakage gaging means carried and bodily positioned by said contact means and operative beyond the limited range of movement of said contact means determined by said limit means.

3. Gaging means as set forth in claim 2 wherein said first gaging means includes indicating means of relatively low amplification for a broad approach range and said air leakage gaging means includes at least one freely rotatable ball contact and a leakage orifice controlled thereby, both bodily carried with said gaging contact means, and indicating means of relatively high amplification operatively connected to said orifice for precise indication as a final dimension is approached.

4. Gaging apparatus comprising a body, gaging contact means movably supported by said body for positioning engagement with the work to be gaged, first gaging means cooperating between said contact means and said body responsive to the relative positions thereof, limit means cooperating between said contact means and said body, and second gaging means including means carried by said contact means for cooperation with the work and responsive to dimensions beyond the limited movement of the gaging contact means.

5. Gaging apparatus comprising a body, a first gaging contact movably supported by said body for positioning engagement at one location with the work to be gaged, first gaging means cooperating between said contact and said body responsive to the relative positions thereof, limit means cooperating between said first contact and said body, a second gaging contact carried by said first contact for movement relative thereto and engagement with the work at the same location, and second gaging means responsive to the relative disposition of the first and second gaging contacts during gaging and to dimensions beyond the limited movement of the first gaging contact.

6. Gaging apparatus comprising a body, a gaging contact movably supported by said body for positioning engagement with the work to be gaged, first gaging means of relatively low amplification cooperating between said contact and said body responsive to the relative positions thereof, limit means cooperating between said contact and said body, and gaging means of relatively high amplification including means carried by said contact for cooperation with the work and responsive to dimensions beyond the limited movement of the gaging contact.

7. Gaging apparatus for in-process gaging comprising a body, a first gaging contact movably supported by said body for positioning engagement with the work to be gaged, first gaging means cooperating between said first contact and said body including air leakage gaging means responsive to the relative positions thereof, limit means cooperating between said first contact and said body, a second gaging contact movably supported by said first contact, second gaging means including air leakage gaging means controlled by the relative positions between the first and second gaging contacts, said first and second gaging means including indicating means of relatively low and high amplifications respectively.

8. Gaging apparatus comprising a body, a first gaging contact movably supported by said body and having an outer end conformed for positioning engagement with the work to be gaged, first gaging means cooperating between said first contact and said body responsive to the relative positions thereof, limit means cooperating between said contact and said body, a second gaging contact movably supported centrally in the outer end of said first contact for positioning engagement with the work at the same location and movable beyond the range of movement of the first gaging contact, second gaging means cooperating between said first and second contacts, whereby both gaging contacts initially engage the work and the work is engaged solely by the second contact during a second gaging phase.

9. Gaging apparatus comprising a body, opposed gaging contacts supported by said body for relative movement through a limited gaging range and positioning engagement with a work surface to be gaged, limit means on said body determining said limited range of gaging movement, gaging means controlled by said contacts, further contact means carried and bodily positioned by at least one of said opposed contacts and movable relative to the respective contact for positioning engagement with the work beyond the limited range of relative movement of said opposed contacts, and gaging means controlled by said further contact means.

10. Gaging apparatus comprising a body, opposed gaging contacts movably supported by said body for positioning engagement with the work to be gaged, limit means cooperating between each of said contacts and said body, further contact means carried by each of said movable contacts for cooperation with the work and responsive to dimensions beyond the limited range of movements of the respective carrying contacts, and gaging means responsive to the positions of each of the gaging contacts relative to the body and the relative positions of each gaging contact and its associated further contact means, said gaging means including first indicating means responsive to the relative positions of the further contact means with said contacts at their limits of movement, and third and fourth indicating means each independently responsive to the positions of one of said opposed gaging contacts relative to the body.

11. Gaging apparatus comprising an elongated body, a first gaging contact fixed at one end of said body for engagement with one side of the work to be gaged, a second gaging contact slidably carried at the other end of said body for positioning engagement with the other side of the work to be gaged, first gaging means responsive to the relative positions of said second gaging contact and said body, limit means cooperating between said second contact and said body, gaging contact means carried by said second contact for engagement with the work at the same location therealong, and second gaging means responsive to the relative positions of said contact means and said second gaging contact responsive to dimensions beyond the limited range of movement of said second gaging contact.

12. A gaging apparatus as set forth in claim 11 wherein said first gaging means comprises an air leakage orifice in said body adapted for connection to a source of air under pressure and a gage and an opposing flow controlling surface on said second gaging contact, said gaging contact means comprising a freely rotatable ball for engagement with the work and an orifice in said second gaging contact in flow controlling relationship with said ball adapted for connection to a source of air under pressure and an air gage.

References Cited in the file of this patent

UNITED STATES PATENTS

| | | |
|---|---|---|
| 2,504,212 | Mennesson | Apr. 18, 1950 |
| 2,624,125 | Johnson | Jan. 6, 1953 |
| 2,706,339 | Aller | Apr. 19, 1955 |